United States Patent
Kitahara

(10) Patent No.: US 6,445,511 B1
(45) Date of Patent: Sep. 3, 2002

(54) INNER-FOCUS-TYPE LENS

(75) Inventor: You Kitahara, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/059,255

(22) Filed: Jan. 31, 2002

(30) Foreign Application Priority Data

Mar. 15, 2001 (JP) ........................................ 2001-075010

(51) Int. Cl.$^7$ .............................................. G02B 13/02
(52) U.S. Cl. ........................................................ 359/748
(58) Field of Search ................................ 359/785, 786, 359/740, 745–748

(56) References Cited

U.S. PATENT DOCUMENTS

| | | | | |
|---|---|---|---|---|
| 4,437,734 A | * | 3/1984 | Iizuka | 359/745 |
| 4,527,868 A | * | 7/1985 | Mihara | 359/745 |
| 4,609,263 A | * | 9/1986 | Imaizumi | 359/745 |
| 4,709,998 A | * | 12/1987 | Yamanashi | 359/745 |
| 4,812,026 A | * | 3/1989 | Iima | 359/745 |
| 4,852,984 A | * | 8/1989 | Takahashi et al. | 359/740 |
| 5,490,014 A | * | 2/1996 | Suzuki | 359/557 |
| 5,610,769 A | * | 3/1997 | Shoji | 359/745 |
| 6,381,079 B1 | * | 4/2002 | Ogawa | 359/569 |
| 6,384,975 B1 | * | 5/2002 | Hayakawa | 359/557 |

FOREIGN PATENT DOCUMENTS

| | | |
|---|---|---|
| JP | 61-51117 | 3/1986 |
| JP | 10-206729 | 8/1998 |

* cited by examiner

*Primary Examiner*—Evelyn A Lester
(74) *Attorney, Agent, or Firm*—Arnold International; Bruce Y. Arnold

(57) ABSTRACT

An inner-focus-type lens is formed of three lens groups of positive, negative and positive refractive power, respectively, in order from the object side. The first lens group is formed of four lens elements of positive, positive, negative and negative refractive power, in order from the object side. The second lens group has at least one each of a positive lens element and a negative lens element and is moved along the optical axis in order to focus the inner-focus-type lens. The third lens group has a stop and at least one each of a positive lens element and a negative lens element. Preferably, various conditions are satisfied in order to provide a compact lens that has a large back focus and which favorably corrects various aberrations so as to provide a high quality image.

17 Claims, 6 Drawing Sheets

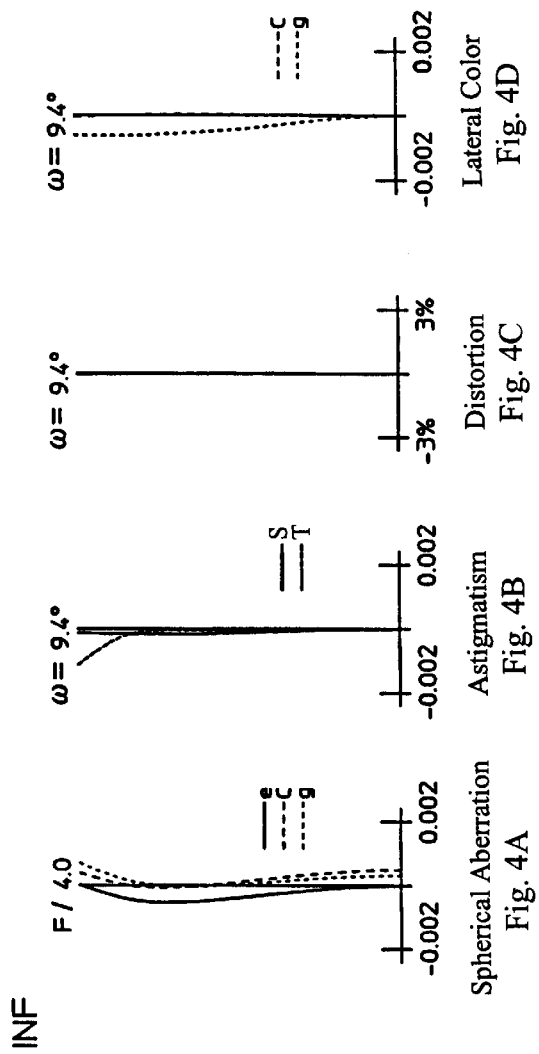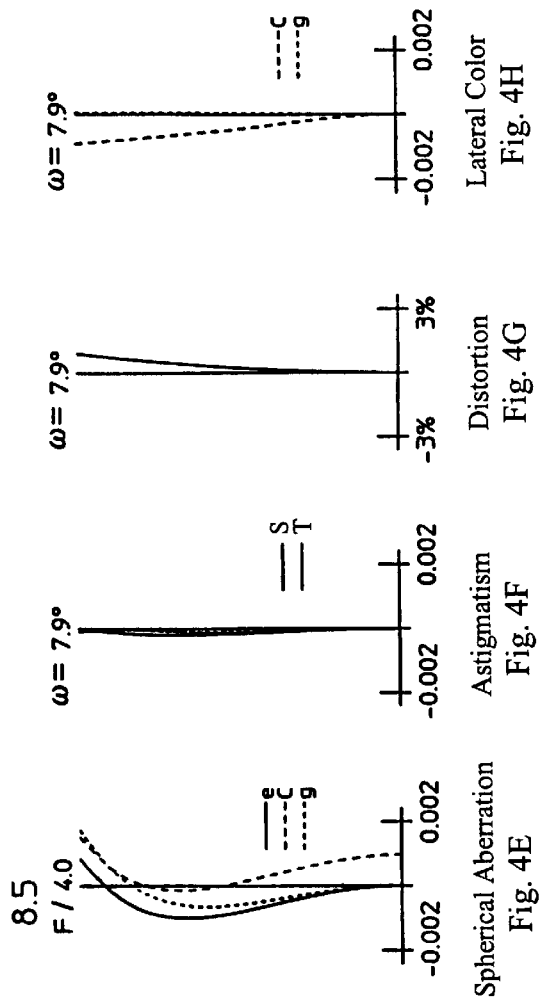

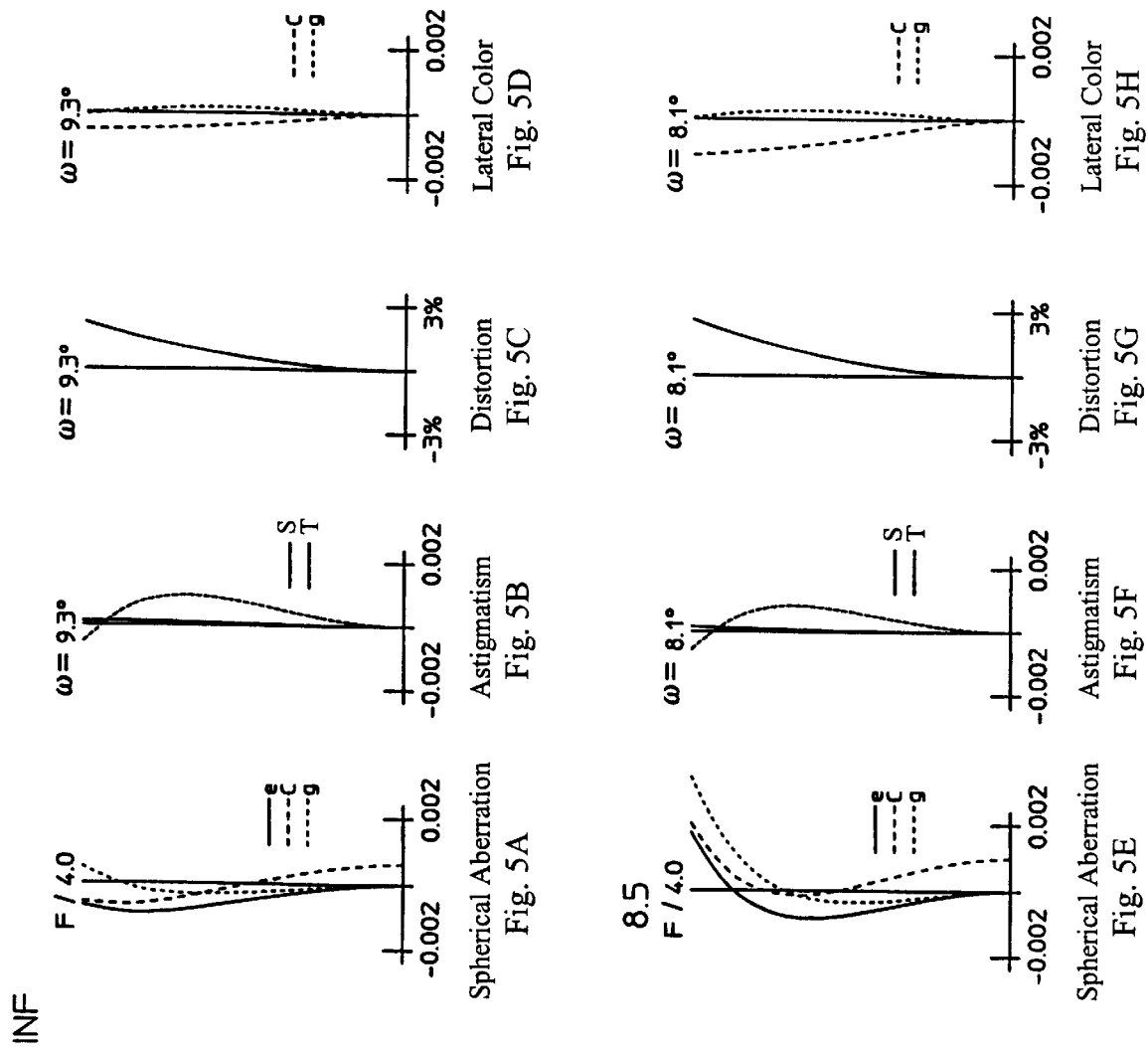

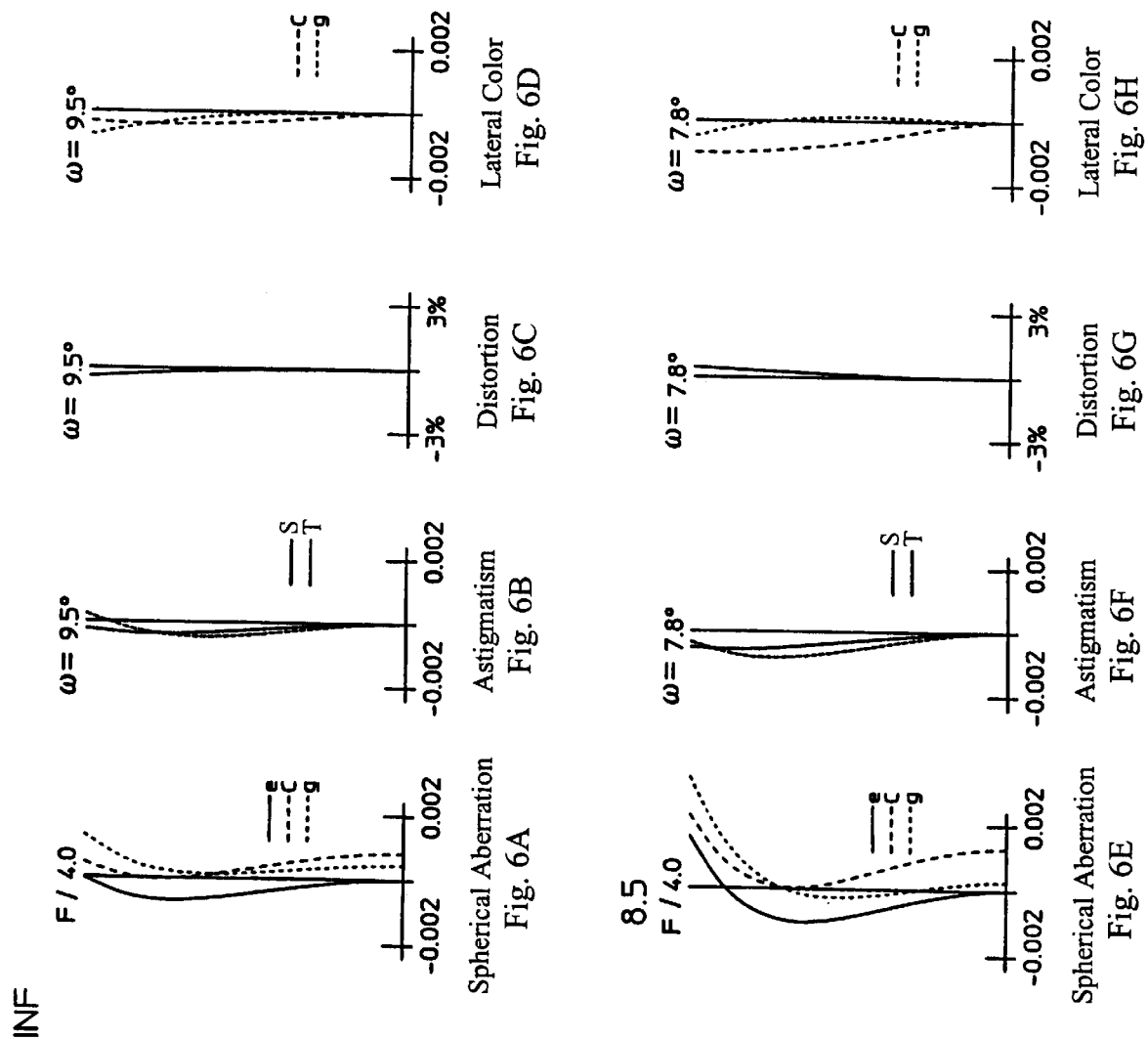

INNER-FOCUS-TYPE LENS

BACKGROUND OF THE INVENTION

Generally speaking, focusing with a camera which uses photographic film is performed by moving either the entire camera lens or by moving only one part of the camera lens. It is difficult mechanically to rapidly perform focus adjustment by moving the entire camera lens, as the entire camera lens becomes too massive for cameras that use large film sizes.

Even for 6 mm×8 mm size film (i.e., mid-size film), it is desirable to adapt an inner-focus technique wherein only a part of the lens is moved for focusing. Further, it is desirable that the moving distance of the lens group that is moved for focusing be as short as possible.

Various developments of inner-focus-type lenses have been made for mid-size film lenses. See, for example, Japanese Laid Open Patent Application S61-051117, and Japanese Laid Open Patent Application H10-206729. However, there remains a demand for improved inner-focus-type lenses where focusing is accomplished even faster.

BRIEF SUMMARY OF THE INVENTION

The present invention provides a high performance, inner-focus-type lens having a faster focusing response rate than was previously available in lenses of cameras for use with mid-size (6 mm×8 mm) film. More specifically, the object of the present invention is to provide an inner-focus-type lens with a focal length of about 300 mm and an F number of about 4.0 which has a rapid focus response and that is especially suited for use as a lens of a camera that utilizes mid-size film.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4D show the spherical aberration, astigmatism, distortion, and lateral color, respectively, of the inner-focus-type lens of Embodiment 1 when focused at infinity, and FIGS. 4E–4H show these same aberrations for an object distance of 8.5 meters;

FIGS. 5A–5D show the spherical aberration, astigmatism, distortion, and lateral color, respectively, of the inner-focus-type lens of Embodiment 2 when focused at infinity, and FIGS. 5E–5H show these same aberrations for an object distance of 8.5 meters; and FIGS. 6A–6D show the spherical aberration, astigmatism, distortion, and lateral color, respectively, of the inner-focus-type lens of Embodiment 3 when focused at infinity, and FIGS. 6E–6H show these same aberrations for an object distance of 8.5 meters.

DETAILED DESCRIPTION

The inner-focus-type lens of the present invention is formed of three lens groups having, in order from the object side, positive, negative, and positive refractive power. The first and third lens groups are fixed in position and the second lens group is moved along the optical axis for focusing. The first lens group G1 is formed of, in order from the object side, two positive lens elements and two negative lens elements. The second lens group G2 and the third lens group G3 each have at least one negative lens element and one positive lens element, and the third lens group includes a stop nearest the object side. In addition, the following Conditions (1)–(3) are preferably satisfied:

$0.6 < f_1/f < 0.7$     Condition (1)

$-1.0 < f_2/f < -0.5$     Condition (2)

$0.7 < f_3/f < 1.6$     Condition (3)

where $f_1$ is the focal length of the first lens group, $f$ is the focal length of the inner-focus-type lens when focused at infinity, $f_2$ is the focal length of the second lens group, and $f_3$ is the focal length of the third lens group.

Preferably, the first lens group G1 is formed of, in order from the object side, a biconvex lens element having surfaces of different radii of curvature and with the surface of smaller radius of curvature on the object side, a positive lens element having a convex surface on the object side, a negative lens element having a concave surface on the image side, and a negative meniscus lens element having its convex surface on the object side.

It is also preferred that the second lens group G2 is formed of, in order from the object side, a positive lens element that is cemented to a negative lens element.

The third lens group G3, after the stop, may be formed as follows, in order from the object side:

(a) a negative meniscus lens element having its concave surface on the object side, and a cemented lens of overall positive refractive power that is formed of, in order from the object side, a negative meniscus lens element with its concave surface on the image side cemented to a biconvex lens element; or (b) a biconcave lens element and a biconvex lens element that are separated by air; or (c) a cemented lens of overall negative refraction power that is formed of a biconcave lens element that is cemented to a biconvex lens element, and a cemented lens of overall positive refractive power that is formed of a negative meniscus lens element with its concave surface on the image side cemented to a biconvex lens element.

The invention will first be explained in general terms with reference to the drawings.

Figure 1:
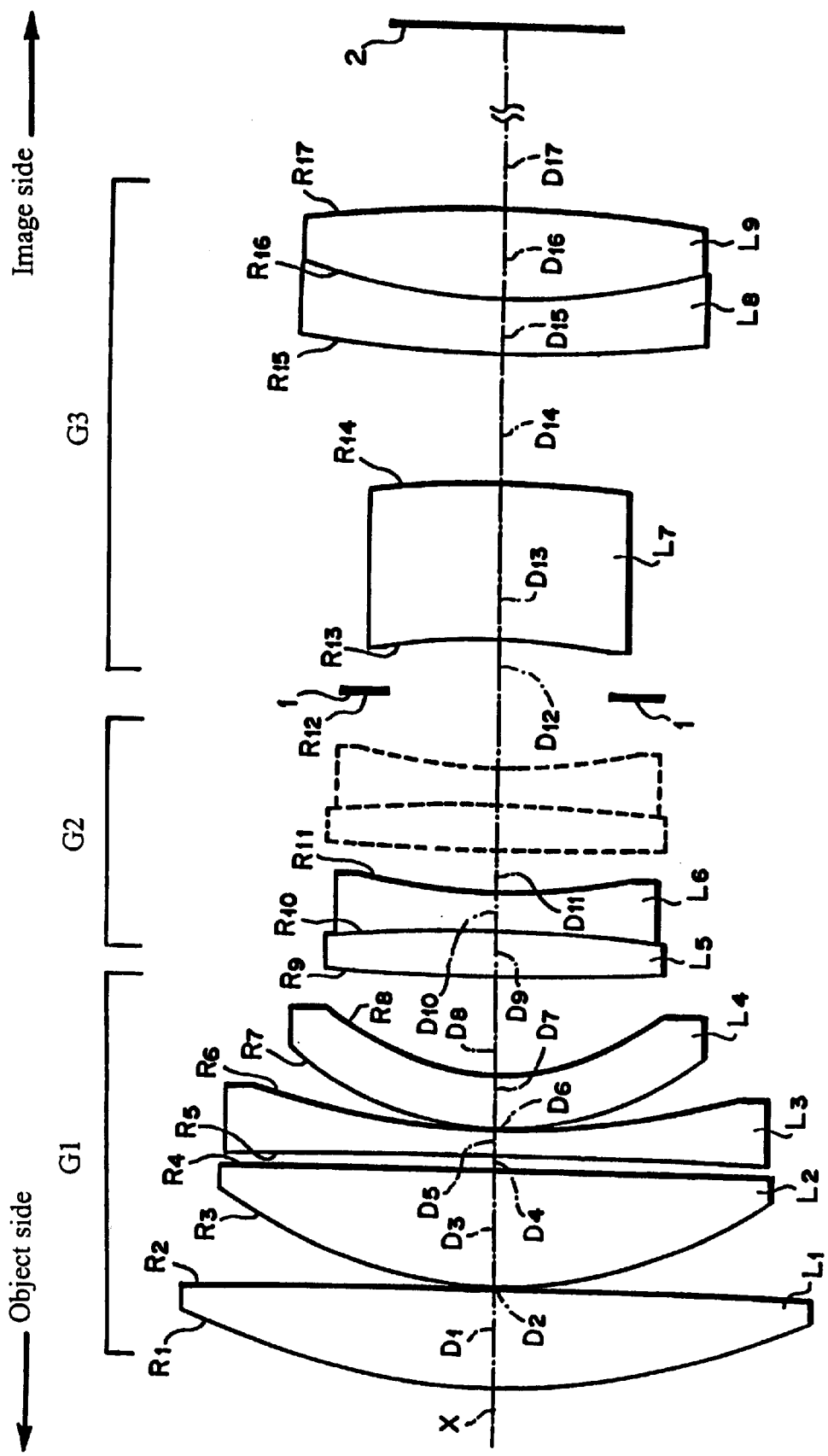
FIG. 1 shows the basic lens element configuration of the inner-focus-type lens of Embodiment 1.

FIG. 1 shows the basic lens element configuration of Embodiment 1, which is also generally representative of the invention, is primarily used as a lens for a single-lens reflex camera that employs mid-size film, and is formed of three lens groups as discussed above. A stop 1 is included in the third lens group nearest the object side, and focusing is achieved by moving the second lens group along the optical axis as indicated, when focusing from infinity (solid line) to a nearby position (dotted line).

The first lens group G1 is formed of, in order from the object side, a biconvex lens element $L_1$ having surfaces of radii of curvature, with the surface of smaller radius of curvature on the object side, a positive lens element $L_2$ with a convex surface on the object side, a negative lens element L₃ (e.g., a biconcave lens) with a concave surface on the image side, and a negative meniscus lens element L₄ with its convex surface on the object side.

The second lens group G2 is formed of a cemented lens composed of, in order from the object side, a positive lens element L₅ and negative lens element L₆.

The third lens group G3 is formed of, in order from the object side, a negative meniscus lens element L₇ with its concave surface on the object side, and a cemented lens which has overall positive refractive power and is composed of a negative meniscus lens element L₈ with its concave surface on the image side cemented to a biconvex lens element L₉. Preferably, the inner-focus-type lens of the present invention is constructed to satisfy the above Conditions (1)–(3).

The optical axis X is illustrated in FIG. 1, and light flux that is incident onto the inner-focus-type lens from the object side is imaged at surface 2.

Because the first lens group GI has two positive lens elements, the first lens element L₁ and the second lens element L₂ share in converging the incident light flux, thereby reducing aberrations as compared with the aberrations that would be generated if the first lens group contained only a single positive lens element. Further, it is intended that the spherical aberration that is generated by these two lens elements be corrected on the concave surface that forms the image side of the fourth lens element L₄ of negative meniscus shape.

By having the second lens group G2 be formed of a cemented lens, namely lens element L₅ of positive refractive power cemented to lens element L₆ of negative refractive power, it is intended that fluctuations of chromatic aberration when focusing, as well as the axial chromatic aberration on the short wavelength side, be suppressed.

Further, as the third lens group G3 is constructed, after the stop, to have a negative lens and a positive lens, in order from the object side, which are separated by air, there may be symmetrical power distribution of lenses relative to the stop. This is helpful in favorably correcting fluctuations of high order spherical aberrations and coma.

With the above construction, a lens for taking pictures, wherein the various aberrations are favorably corrected, can be made while keeping small the outer diameter of the lens elements as well as that of the stop. Having the outer diameter of the lens elements and the stop small enables the lens barrel to be small, while still providing room for the focus driving mechanism, shutter and stop.

The purpose of Conditions (1)–(3) will now be explained in detail. If the lower limit of Condition (1) is not satisfied, the fluctuation of spherical aberration, coma and image surface curvature becomes large when the object distance changes from infinity to nearby. Therefore, correction of these aberrations becomes difficult, particularly at short object distances. On the other hand, if the upper limit of Condition (1) is exceeded, the moving distance of the second lens group during focusing over the range of object distances becomes excessive, causing the overall lens length and the diameter of the second lens group to increase.

If the lower limit of Condition (2) is not satisfied, the moving distance of the second lens group during focusing over the range of object distances becomes excessive, causing the overall lens length to increase. In the other hand, if the upper limit of Condition (2) is exceeded, the fluctuation of coma, axial chromatic aberration and lateral color becomes large, causing the image quality at short object distances to deteriorate.

If the lower limit of Condition (3) is not satisfied, it is difficult to provide a sufficiently large back focus. On the other hand, if the upper limit of Condition (3) is exceeded, the overall length of the lens becomes excessive and the diameters of the first and second lens elements, in order from the object side, become too large.

Several specific embodiments of the present invention will now be described in detail.

Embodiment 1

As mentioned previously, FIG. 1 shows the basic lens element configuration of the inner-focus-type lens of Embodiment 1.

Table 1 below lists the surface number # in order from the object side, the radius of curvature R (in mm) of each surface, the spacing D (in mm) between surfaces, as well as the index of refraction $N_d$ and the Abbe number $\nu_d$ for each lens element of Embodiment 1. In the middle portion of the table are listed the focal length f, the F-number $F_{NO}$, the half-image angle ω, the ratios corresponding to Conditions (1)–(3), and the inner diameter (in mm) of the stop 1 (i.e., surface # 12). In the bottom portion of the table are listed the values of D8 and D11 when focusing on an object at infinity versus 8.5 meters.

TABLE 1

| # | R | D | $N_d$ | $\nu_d$ |
|---|---|---|---|---|
| 1 | 0.3836 | 0.05418 | 1.49700 | 81.6 |
| 2 | −5.4818 | 0.00095 | | |
| 3 | 0.2441 | 0.06205 | 1.49700 | 81.6 |
| 4 | ∞ | 0.00668 | | |
| 5 | −8.0289 | 0.01397 | 1.65412 | 39.7 |
| 6 | 0.4817 | 0.00090 | | |
| 7 | 0.1807 | 0.02676 | 1.83400 | 37.2 |
| 8 | 0.1369 | D8 (variable) | | |
| 9 | 1.7567 | 0.02430 | 1.80518 | 25.4 |
| 10 | −1.0040 | 0.02013 | 1.75700 | 47.8 |
| 11 | 0.3185 | D11 (variable) | | |
| 12 | ∞ (stop) | 0.02918 | | |
| 13 | −0.3967 | 0.08341 | 1.74000 | 28.3 |
| 14 | −0.6970 | 0.06825 | | |
| 15 | 0.8508 | 0.02960 | 1.80610 | 40.9 |
| 16 | 0.3382 | 0.04807 | 1.75500 | 52.3 |
| 17 | −0.8388 | 0.43423 | | | f = 1.0   $F_{NO}$ = 4.0   ω = 9.4°
$f_1/f$ = 0.624
$f_2/f$ = −0.542
$f_3/f$ = 0.823
stop 1 inner diameter = 0.121

| | Object at ∞ | Object at 8.5 m |
|---|---|---|
| D8 | 0.05243 | 0.11663 |
| D11 | 0.10813 | 0.04393 |

As is apparent from the listed values which correspond to Conditions (1)–(3), this embodiment satisfies each of Conditions (1)–(3).

FIGS. 4A–4D show the spherical aberration, astigmatism, distortion, and lateral color, respectively, of the inner-focus-type lens of Embodiment 1 when focused at infinity, and FIGS. 4E–4H show these same aberrations for an object distance of 8.5 meters. In FIGS. 4B–4D and 4F–4H, ω indicates the half-image angle. In FIGS. 4A and 4E, the spherical aberration is shown for the e, g and C lines. In FIGS. 4B and 4F, the astigmatism is shown for both the sagittal S and tangential T image planes. In FIGS. 4D and 4H, the lateral color is shown for both the C and g lines.

As is apparent from the above, Embodiment 1 satisfies each of the Conditions (1)–(3) and provides excellent optical performance while having a short moving distance of the lens elements that are moved during focusing.

Embodiment 2

Figure 2:
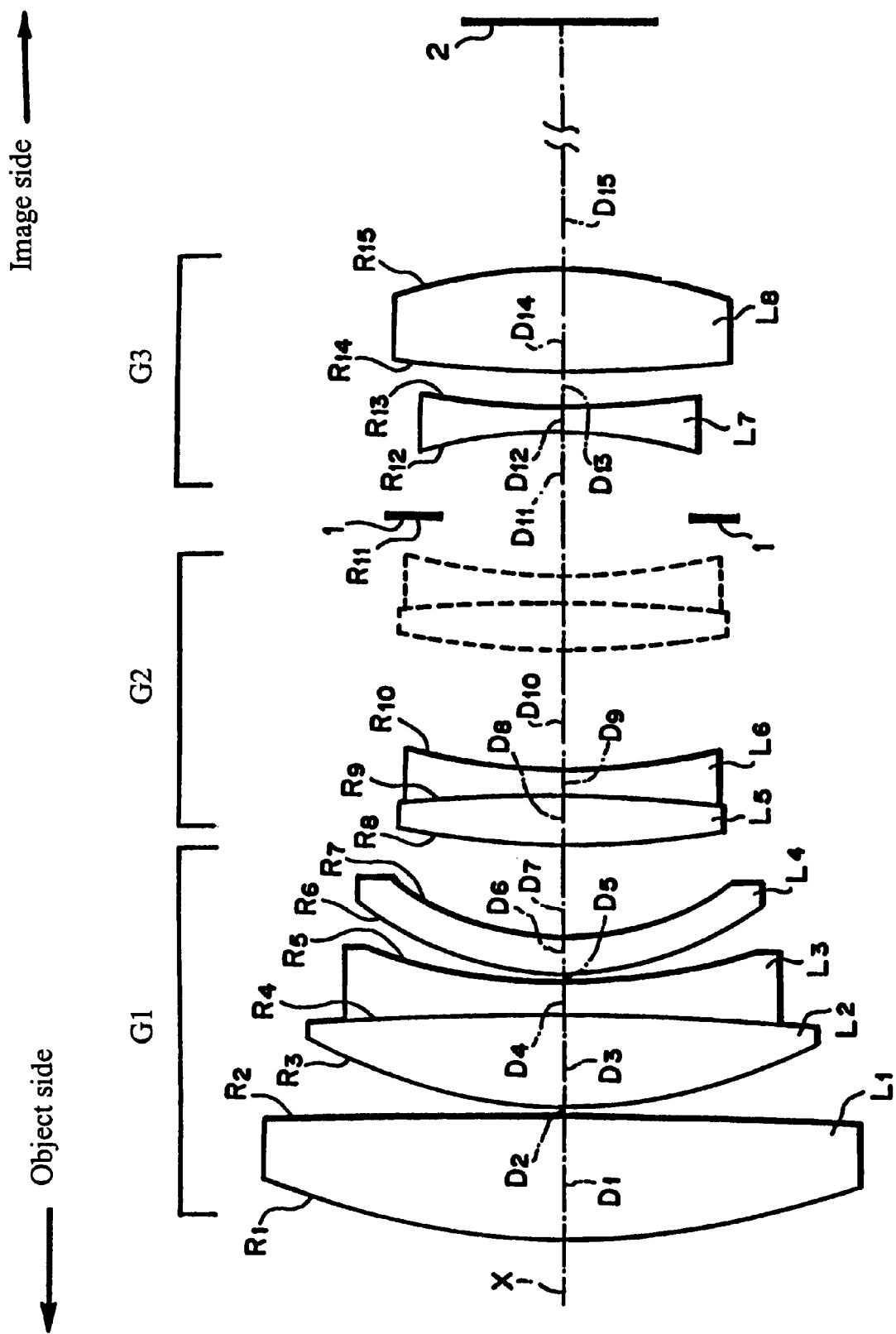
FIG. 2 shows the basic lens element configuration of the inner-focus-type lens of Embodiment 2.

FIG. 2 shows the basic lens element configuration of the inner-focus-type lens of Embodiment 2, which differs from that of Embodiment 1 in that the second lens element $L_2$ and the third lens element $L_3$ in this embodiment are a cemented lens, and the third lens group G3 in this embodiment is composed of, in order from the object side, a biconcave lens element $L_7$ that is spaced in air from a biconvex lens element $L_8$.

Table 2 below lists the surface number # in order from the object side, the radius of curvature R (in mm) of each surface, the spacing D (in mm) between surfaces, as well as the index of refraction $N_d$ and the Abbe number $v_d$ for each lens element of Embodiment 2. In the middle portion of the table are listed the focal length f, the F-number $F_{NO}$, the half-image angle ω, the ratios corresponding to Conditions (1)–(3), and the inner diameter (in mm) of the stop 1 (i.e., surface # 11). In the bottom portion of the table are listed the values of D7 and D10 when focusing on an object at infinity versus 8.5 meters.

TABLE 2

| # | R | D | $N_d$ | $v_d$ |
|---|---|---|---|---|
| 1 | 0.4457 | 0.06373 | 1.49700 | 81.6 |
| 2 | −3.8818 | 0.00410 | | |
| 3 | 0.2791 | 0.04598 | 1.61800 | 63.4 |
| 4 | −1.6880 | 0.01676 | 1.65412 | 39.7 |
| 5 | 0.3650 | 0.00354 | | |
| 6 | 0.1756 | 0.01742 | 1.72342 | 38.0 |
| 7 | 0.1476 | D7 (variable) | | |
| 8 | 0.4521 | 0.02395 | 1.67270 | 32.1 |
| 9 | −1.0754 | 0.01437 | 1.83481 | 42.7 |
| 10 | 0.3345 | D10 (variable) | | |
| 11 | ∞ (stop) | 0.04208 | | |
| 12 | −0.2921 | 0.01197 | 1.61340 | 44.3 |
| 13 | 0.4430 | 0.01870 | | |
| 14 | 0.7211 | 0.05253 | 1.71300 | 53.9 |
| 15 | −0.2671 | 0.52566 | | | f = 1.0   $F_{NO}$ = 4.0   ω = 9.3°
$f_1/f$ = 0.679
$f_2/f$ = −0.928
$f_3/f$ = 1.537
stop 1 inner diameter = 0.132

| | Object at ∞ | Object at 8.5 m |
|---|---|---|
| D7 | 0.04790 | 0.14326 |
| D10 | 0.13012 | 0.03476 |

As is apparent from the listed values which correspond to Conditions (1)–(3), this embodiment satisfies each of Conditions (1)–(3).

FIGS. 5A–5D show the spherical aberration, astigmatism, distortion, and lateral color, respectively, of the inner-focus-type lens of Embodiment 2 when focused at infinity, and FIGS. 5E–5H show these same aberrations for an object distance of 8.5 meters. In FIGS. 5B–5D and 5F–5H, ω indicates the half-image angle. In FIGS. 5A and 5E, the spherical aberration is shown for the e, g and C lines. In FIGS. 5B and 5F, the astigmatism is shown for both the sagittal S and tangential T image planes. In FIGS. 5D and 5H, the lateral color is shown for both the C and g lines. As is apparent from the above, Embodiment 2 satisfies each of the Conditions (1)–(3) and provides excellent optical performance while having a short moving distance of the lens elements that are moved during focusing.

Embodiment 3

Figure 3:
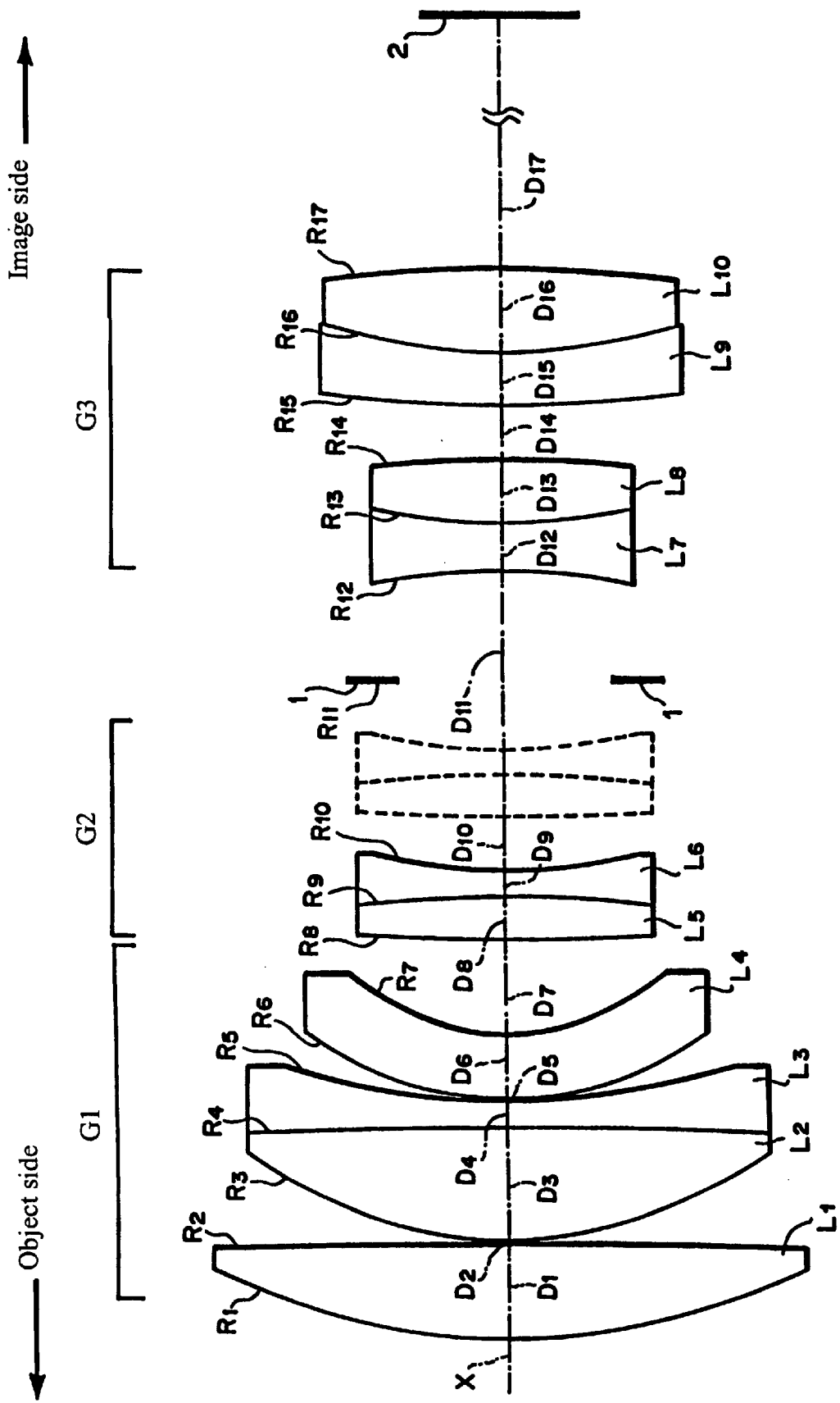
FIG. 3 shows the basic lens element configuration of the inner-focus-type lens of Embodiment 3.

FIG. 3 shows the basic lens element configuration of the inner-focus-type lens of Embodiment 3, which is similar to that of Embodiment 2 except that the third lens group G3 in this embodiment is formed of two cemented lenses. In order from the object side, the first cemented lens, which has overall negative refractive power, is composed of a biconcave lens element $L_7$ that is cemented to a biconvex lens element $L_8$. The second cemented lens, which has overall positive refractive power, is composed of, in order from the object side, a negative meniscus lens element $L_9$ with its concave surface on the image side cemented to a biconvex lens element $L_{10}$.

Table 3 below lists the surface number # in order from the object side, the radius of curvature R (in mm) of each surface, the spacing D (in mm) between surfaces, as well as the index of refraction $N_d$ and the Abbe number $v_d$ for each lens element of Embodiment 3. In the middle portion of the table are listed the focal length f, the F-number $F_{NO}$, the half-image angle ω, the ratios corresponding to Conditions (1)–(3), and the inner diameter (in mm) of the stop 1 (i.e., surface # 11). In the bottom portion of the table are listed the values of D7 and D10 when focusing on an object at infinity versus 8.5 meters.

TABLE 3

| # | R | D | $N_d$ | $v_d$ |
|---|---|---|---|---|
| 1 | 0.3784 | 0.05211 | 1.48749 | 70.2 |
| 2 | −7.9197 | 0.00218 | | |
| 3 | 0.2384 | 0.06301 | 1.49700 | 81.6 |
| 4 | −4.3965 | 0.01516 | 1.65412 | 39.7 |
| 5 | 0.4633 | 0.00095 | | |
| 6 | 0.1977 | 0.03477 | 1.58144 | 40.7 |
| 7 | 0.1347 | D7 (variable) | | |
| 8 | 1.2778 | 0.02369 | 1.80518 | 25.4 |
| 9 | −0.8199 | 0.01421 | 1.81600 | 46.6 |
| 10 | 0.3148 | D10 (variable) | | |
| 11 | ∞ (stop) | 0.06083 | | |
| 12 | −0.3859 | 0.02762 | 1.71736 | 29.5 |
| 13 | 0.3859 | 0.03463 | 1.80400 | 46.6 |
| 14 | −0.7449 | 0.02951 | | |
| 15 | 0.9050 | 0.02823 | 1.80518 | 25.4 |
| 16 | 0.3313 | 0.04737 | 1.74000 | 28.3 |
| 17 | −0.7742 | 0.45940 | | | f = 1.0   $F_{NO}$ = 4.0   ω = 9.5°
$f_1/f$ = 0.644
$f_2/f$ = −0.514
$f_3/f$ = 0.781
stop 1 inner diameter = 0.127

| | Object at ∞ | Object at 8.5 m |
|---|---|---|
| D7 | 0.05212 | 0.11679 |
| D10 | 0.10896 | 0.04429 |

As is apparent from the listed values which correspond to Conditions (1)–(3), this embodiment satisfies each of Conditions (1)–(3).

FIGS. 6A–6D show the spherical aberration, astigmatism, distortion, and lateral color, respectively, of the inner-focus-type lens of Embodiment 3 when focused at infinity, and FIGS. 6E–6H show these same aberrations for an object distance of 8.5 meters. In FIGS. 6B–6D and 6F–6H, ω indicates the half-image angle. In FIGS. 6A and 6E, spherical aberration is shown for the e, g and C lines. In FIGS. 6B and 6F, the astigmatism is shown for both the sagittal S and tangential T image planes. In FIGS. 6D and 6H, the lateral color is shown for both the C and g lines.

As is apparent from the above, Embodiment 3 satisfies each of the Conditions (1)–(3) and provides excellent optical performance while having a short moving distance of the lens elements that are moved during focusing.

As shown in Embodiments 1 and 3 above, if the lens is constructed with the distribution of refractive power so as to also satisfy the following Conditions (4)–(6) below, the astigmatism and distortion will be less:

$0.6 < f_1/f < 0.65$        Condition (4)

$-0.6 < f_2/f < -0.5$        Condition (5)

$0.7 < f_3/f < 0.9$        Condition (6)

where $f_1$, $f_2$, $f_3$, and f are as defined above.

The invention being thus described, it will be obvious that the same may be varied in many ways. For example, the radii of curvature of the surfaces and surface spacings of the embodiments above may be readily scaled to achieve a lens suitable for a different film size. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An inner-focus-type lens comprising three lens groups of positive, negative and positive refractive power, respectively, in order from the object side, as follows:

a first lens group formed of four lens elements of positive, positive, negative and negative refractive power, respectively, in order from the object side;

a second lens group having at least one each of a positive lens element and a negative lens element, said second lens group being moved along the optical axis in order to focus the inner-focus-type lens; and a third lens group that includes a stop nearest the object side, and at least one each of a positive lens element and a negative lens element;

wherein the following conditions are satisfied:

$0.6 < f_1/f < 0.7$ $-1.0 < f_2/f < -0.5$ $0.7 < f_3/f < 1.6$ where $f_1$ is the focal length of the first lens group, f is the focal length of the inner-focus-type lens when focused at infinity, $f_2$ is the focal length of the second lens group, and $f_3$ is the focal length of the third lens group.

2. The inner-focus-type lens according to claim 1, wherein the second lens group includes a positive lens element that is cemented to a negative lens element.

3. The inner-focus-type lens according to claim 1, wherein the first lens group is formed of, in order from the object side: a biconvex lens element having surfaces of different radii of curvature, with the surface of smaller radius of curvature on the object side, a positive lens element having a convex surface on the object side, a negative lens having a concave surface on the image side and a negative meniscus lens element having its convex surface on the object side.

4. The inner-focus-type lens according to claim 2, wherein the first lens group is formed of, in order from the object side: a biconvex lens element having surfaces of different radii of curvature, with the surface of smaller radius of curvature on the object side, a positive lens element having a convex surface on the object side, a negative lens having a concave surface on the image side and a negative meniscus lens element having its convex surface on the object side.

5. The inner-focus-type lens according to claim 1, wherein the third lens group is formed of, in order from the object side, a negative meniscus lens element with its concave surface on the object side and a cemented lens which has overall positive refractive power and is composed of a negative meniscus lens element with its convex surface on the object side cemented to a biconvex lens element.

6. The inner-focus-type lens according to claim 2, wherein the third lens group is formed of, in order from the object side, a negative meniscus lens element with its concave surface on the object side and a cemented lens which has overall positive refractive power and is composed of a negative meniscus lens element with its convex surface on the object side cemented to a biconvex lens element.

7. The inner-focus-type lens according to claim 3, wherein the third lens group is formed of, in order from the object side, a negative meniscus lens element with its concave surface on the object side and a cemented lens which has overall positive refractive power and is composed of a negative meniscus lens element with its convex surface on the object side cemented to a biconvex lens element.

8. The inner-focus-type lens according to claim 1, wherein the third lens group is formed of, in order from the object side, a biconcave lens element and a biconvex lens element.

9. The inner-focus-type lens according to claim 2, wherein the third lens group is formed of, in order from the object side, a biconcave lens element and a biconvex lens element.

10. The inner-focus-type lens according to claim 3, wherein the third lens group is formed of, in order from the object side, a biconcave lens element and a biconvex lens element.

11. The inner-focus-type lens according to claim 1, wherein the third lens group is formed of two cemented lenses, in order from the object side, as follows:

a first cemented lens which has negative overall refractive power and is composed of a biconcave lens element that is cemented to a biconvex lens element; and a second cemented lens which has positive overall refractive power and is composed of a negative meniscus lens element having its concave surface on the image side cemented to a biconvex lens element.

12. The inner-focus-type lens according to claim 2, wherein the third lens group is formed of two cemented lenses, in order from the object side, as follows:

a first cemented lens which has negative overall refractive power and is composed of a biconcave lens element that is cemented to a biconvex lens element; and a second cemented lens which has positive overall refractive power and is composed of a negative meniscus lens element having its concave surface on the image side cemented to a biconvex lens element.

13. The inner-focus-type lens according to claim 3, wherein the third lens group is formed of two cemented lenses, in order from the object side, as follows:

a first cemented lens which has negative overall refractive power and is composed of a biconcave lens element that is cemented to a biconvex lens element; and a second cemented lens which has positive overall refractive power and is composed of a negative meniscus lens element having its concave surface on the image side cemented to a biconvex lens element.

14. An inner-focus-type lens comprising three lens groups of positive, negative and positive refractive power, respectively, in order from the object side, as follows:

a first lens group formed of four lens elements of positive, positive, negative and negative refractive power, respectively, in order from the object side;

a second lens group having at least one each of a positive lens element and a negative lens element, said second lens group being moved along the optical axis in order to focus the inner-focus-type lens; and a third lens group that includes a stop nearest the object side, and at least one each of a positive lens element and a negative lens element.

15. The inner-focus-type lens according to claim 14, wherein the following condition is satisfied:

$$0.6 < f_1/f < 0.7$$

where $f_1$ is the focal length of the first lens group, and f is the focal length of the inner-focus-type lens when focused at infinity.

16. The inner-focus-type lens according to claim 14, wherein the following condition is satisfied:

$$-1.0 < f_2/f < -0.5$$

where $f_2$ is the focal length of the second lens group, and f is the focal length of the inner-focus-type lens when focused at infinity.

17. The inner-focus-type lens according to claim 14, wherein the following condition is satisfied:

$$0.7 < f_3/f < 1.6$$

where $f_3$ is the focal length of the third lens group, and f is the focal length of the inner-focus-type lens when focused at infinity.

* * * * *